US011010796B2

(12) United States Patent
Treadwell et al.

(10) Patent No.: US 11,010,796 B2
(45) Date of Patent: May 18, 2021

(54) EVALUATING CONDOMINIUM APPRAISALS USING PROJECT AS LOCATION EFFECT

(71) Applicant: Fannie Mae, Washington, DC (US)

(72) Inventors: John Treadwell, Washington, DC (US); Eric Rosenblatt, Derwood, MD (US); Jesse Staal, Arlington, VA (US); Lin Feng, Rockville, MD (US); Weifeng Wu, Arlington, VA (US)

(73) Assignee: Fannie Mae, Washington, DC (US)

( * ) Notice: Subject to any disclaimer, the term of this patent is extended or adjusted under 35 U.S.C. 154(b) by 1008 days.

(21) Appl. No.: 14/444,041

(22) Filed: Jul. 28, 2014

(65) Prior Publication Data

US 2016/0027069 A1  Jan. 28, 2016

(51) Int. Cl.
*G06Q 30/02* (2012.01)
*G06Q 50/16* (2012.01)

(52) U.S. Cl.
CPC ......... *G06Q 30/0278* (2013.01); *G06Q 50/16* (2013.01)

(58) Field of Classification Search
CPC .............................. G06Q 30/02; G06Q 50/16
See application file for complete search history.

(56) References Cited

U.S. PATENT DOCUMENTS

| 5,361,201 | A | 11/1994 | Jost et al. |
| 5,966,700 | A | 10/1999 | Gould et al. |
| 7,099,843 | B1 | 8/2006 | Cassidy et al. |
| 7,289,965 | B1 | 10/2007 | Bradley et al. |
| 7,340,431 | B1 | 3/2008 | McManus et al. |
| 7,451,095 | B1 | 11/2008 | Bradley et al. |
| 7,509,261 | B1 | 3/2009 | McManus et al. |
| 7,593,890 | B1 | 9/2009 | Bradley et al. |
| 7,647,272 | B1 | 1/2010 | Muren |
| 7,693,764 | B1 | 4/2010 | Gordon et al. |
| 7,711,574 | B1 | 5/2010 | Bradley et al. |
| 7,792,742 | B1 | 9/2010 | Thomas et al. |

(Continued)

OTHER PUBLICATIONS

Vandell, Kerry D. "Optimal Comparable Selection and Weighting in Real Property Valuation" AREUEA Journal, vol. 19, No. 2, 1991, pp. 213-239.

(Continued)

*Primary Examiner* — Aryan E Weisenfeld
(74) *Attorney, Agent, or Firm* — Michael Best and Friedrich LLP

(57) ABSTRACT

Modeling appropriate comparable properties for the assessment of appraisals entails accessing a property dataset, wherein subsets of properties represented in the property data are determined to be members of respective condominium projects. Condominium project identification information is scrubbed, standardized and updated using various techniques. An automated valuation model is applied to the property data, preferably implementing the condominium project variable as a location fixed effect variable. Appraisal reports where the subject property is a condominium are then analyzed using the results of the automated valuation model, including but not limited to ranking and displaying the appraiser-chosen comparables among the model-chosen comparables.

12 Claims, 9 Drawing Sheets

(56) References Cited

U.S. PATENT DOCUMENTS

| | | |
|---|---|---|
| 7,797,166 B1 | 9/2010 | Bradley et al. |
| 7,835,919 B1 | 11/2010 | Bradley et al. |
| 7,882,025 B1 | 2/2011 | Seal et al. |
| 7,904,381 B1 | 3/2011 | Tatang et al. |
| 7,941,365 B1 | 5/2011 | Bradley et al. |
| 7,941,366 B1 | 5/2011 | Bradley et al. |
| 7,945,510 B1 | 5/2011 | Bradley et al. |
| 7,974,854 B1 | 7/2011 | Bradley et al. |
| 7,987,137 B1 | 7/2011 | Thomas et al. |
| 7,996,304 B1 | 8/2011 | Thomas et al. |
| 7,996,313 B1 | 8/2011 | McMurray et al. |
| 8,010,377 B1 | 8/2011 | Bradley et al. |
| 8,046,306 B2 | 10/2011 | Stinson |
| 8,108,302 B1 | 1/2012 | Bradley et al. |
| 8,140,421 B1 | 3/2012 | Humphries et al. |
| 8,209,258 B1 | 6/2012 | Seal et al. |
| 8,239,318 B1 | 8/2012 | Bradley et al. |
| 8,244,563 B2 | 8/2012 | Coon et al. |
| 8,255,320 B1 | 8/2012 | Seal et al. |
| 8,280,806 B1 | 10/2012 | Bradley et al. |
| 8,326,749 B1 | 12/2012 | Seal et al. |
| 8,386,395 B1 | 2/2013 | Gordon et al. |
| 8,401,868 B1 | 3/2013 | Bradley et al. |
| 8,401,961 B1 | 3/2013 | McMurray et al. |
| 8,447,688 B1 | 5/2013 | Thomas et al. |
| 8,521,644 B1 | 8/2013 | Hanson et al. |
| 2005/0154656 A1 | 7/2005 | Kim et al. |
| 2005/0154657 A1 | 7/2005 | Kim et al. |
| 2008/0004893 A1 | 1/2008 | Graboske |
| 2012/0323799 A1* | 12/2012 | Treadwell ............. G06Q 50/16 705/306 |

OTHER PUBLICATIONS

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

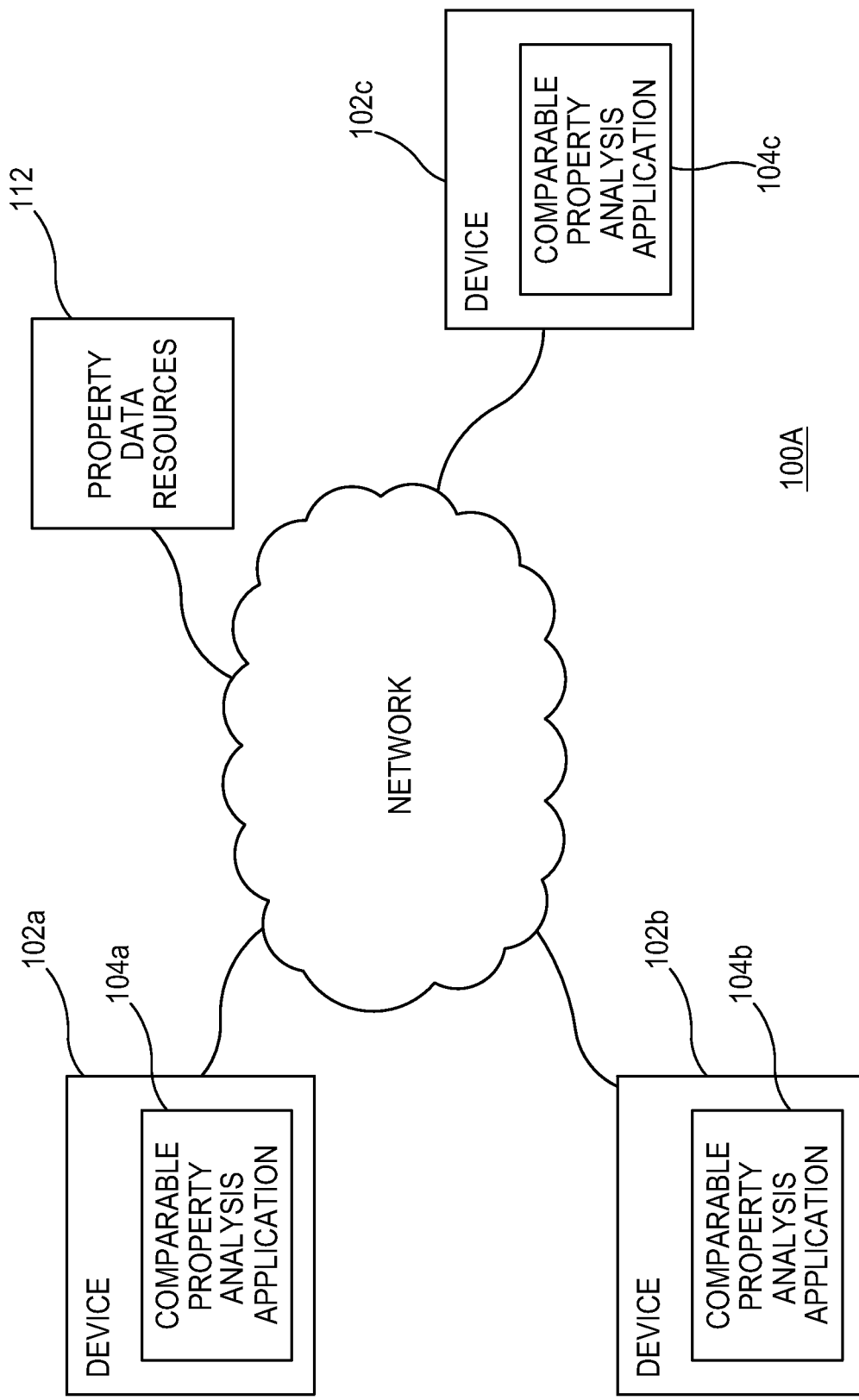

CRAM - Alpha (Condo Appraisal ID# 1574426) - Windows Internet Explorer

URL | Appr 1574426 · Doc 100000011 · Prop 101554925 · Loan · Veros · 469 SMITH RD APT 2405, HONOLULU, HI 98815 · Apprasied $486,000.00 on 2010-05-04 · Purpose: [Refi]

Mapped Comps | Comp Analysis | Adjustment Analysis | Form 1004 | UCDP Messages | Summary | NUC Docs | Value History | Structure characteristics | Sales History | Build Fax | Appraisals | Loan Info | Notes Address or location ... | Apprs | Props | Activity

Appraiser Comps

| | Address | Age | Sq ft | Bed | Bath | Road | Ocean | GD | Fcl | Date | Amount | Appr $ |
|---|---|---|---|---|---|---|---|---|---|---|---|---|
| S | 469 SMITH RD APT 2405, HONOLULU, HI 98815 | 39 | 948 | 2 | 2 | | | 0 | | | | $486,000 |
| AS | 469 SMITH RD APT 2405, HONOLULU, HI 98815 | 39 | 948 | 2 | 2 | | | 0 | 0 | 2010-04-30 | $470,000 | $477,500 |
| AS | 469 SMITH RD APT 2405, HONOLULU, HI 98815 | 39 | 948 | 2 | 2 | | | 0 | 0 | 2009-12-23 | $500,000 | $471,500 |
| AS | 343 JONES LN APT 2203, HONOLULU, HI 96.. | 26 | 945 | 2 | 2 | | | 0.16 | 0 | 2009-12-11 | $550,000 | $506,800 |
| AS | 469 SMITH RD APT 2405, HONOLULU, HI 98815 | 39 | 948 | 2 | 2 | | | 0 | 0 | 2009-10-22 | $549,000 | $464,914 |

720a

Datappraise | Detailed results | StreetView | SkyView | (null sales in past yr)

BG Metrics ▼ Toggle StreetView availability

710a

Map in LaMDA 710, 714

714

Jones Ln

Smith Rd

Tobin BLVD

EVALUATING CONDOMINIUM APPRAISALS USING PROJECT AS LOCATION EFFECT

BACKGROUND OF THE INVENTION

1. Field of the Invention

This application relates to assessment of comparable properties and more particularly to modeling appropriate comparables and evaluating appraisals where the subject property is a condominium property.

2. Description of the Related Art

A residential property appraisal is traditionally performed by an appraiser for the purpose of establishing the market value of a residential property. The most common approach used for residential appraisals in the United States is the sales comparison approach, which is based on the assumption that home purchasers will pay no more for a property than it would cost to purchase a comparable substitute property. Because it is rare to find two identical houses for sale at the same time in the same neighborhood, appraisers often select comparable sales ("comps") that vary from the subject property on a variety of factors, and then account for the differences using a formal adjustment process. The resulting opinion of subject property market value should represent the appraiser's professional conclusion, based on market data, logical analysis, and judgment.

Appraisals may be variously used in connection with transactions including loan approval as well as downstream transactions. Appraisal reports may be reviewed in connection with the approval of transactions. They may also be reviewed at other times, such as to evaluate the accuracy or quality of the appraisal, to identify the possibility of a fraudulent transaction, or to evaluate the work of an appraiser. Traditionally, this might be performed by an assessor who reviews the appraisal report, performs some research and investigates the local market conditions at the time the appraisal report was prepared, and then assesses the results.

The traditional techniques for reviewing and assessing appraisals are subjective, inconsistent, and do not lend themselves to any kind of systematic, large scale review. Additionally, it is particularly difficult to model appropriate comparables, and to assess and evaluate appraisals that have been performed, when the subject property is a condominium property.

Improved techniques are needed for modeling appropriate comparable properties, estimating the relative value of a particular geographic location, and evaluating appraisals when the subject property is a condominium property.

SUMMARY OF THE INVENTION

Consistent with at least one embodiment disclosed herein, modeling appropriate comparable properties for the assessment of appraisals entails accessing a property dataset, wherein subsets of properties represented in the property data are determined to be members of respective condominium projects. These determinations are scrubbed and updated periodically to ensure that the dataset is accessible for accurate and consistent identification of those properties that belong to each identified condominium project.

Following initial scrubbing and standardization of the property data, the condo project identification information is then further refined using one or more of geographic constraints, year-built constraints, filtering of invalid names, and algorithmic regression.

An automated valuation model is applied to the data. Preferably, a hedonic regression is applied to the property data, the regression modeling the relationship between price and explanatory variables. Among these explanatory variables is the condominium project variable, which is preferably a location fixed effect variable. The various condominium projects found in the dataset are respective delineations (values) for the condominium project location fixed effect variable, with the variable having been scrubbed, standardized, and refined as described above.

In a typical application, an appraisal for a subject condominium property that identifies corresponding appraiser-identified comparables may be analyzed. For the same subject property, model-identified comparables are determined to correspond to the subject condominium property using results of the hedonic regression, including the condominium project variable.

An evaluation of the appraisal may be made, either by comparing the appraiser-identified comparables to the model-identified comparables or by reviewing the characteristics of individual appraiser-chosen comparables, or both.

Refinements to the modeling may include determining a set of value adjustments for comparable properties based upon differences in the explanatory variables between the subject condo property and comparable properties, as well as determining an economic distance between the subject condo property and comparable properties, where the economic distance is constituted as a quantified value determined from the value adjustments.

Weighting, ranking and displaying of the comparable properties on a map image may also be performed based upon their appropriateness as comparables for the subject condo property. The weighting and corresponding ranking may be based upon the economic distance from the subject condo property and other factors (e.g., geographic and temporal distance).

The present disclosure can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present disclosure are more fully disclosed in the following specification, reference being had to the accompanying drawings, in which:

FIGS. 1A-B are block diagrams illustrating examples of systems in which a comparable property analysis application operates.

FIG. 7A is a display diagram illustrating an example of a map image and corresponding property grid data for a list of appraiser-chosen comparable properties, where the underlying properties are determined to be condo properties.

FIG. 7B is a display diagram illustrating an example of a map image and property grid data updated to indicate appraiser-chosen comparable properties among a ranked listing of model-chosen comparable properties, where the underlying properties are determined to be condo properties.

DETAILED DESCRIPTION OF THE INVENTION

Figure 1B:
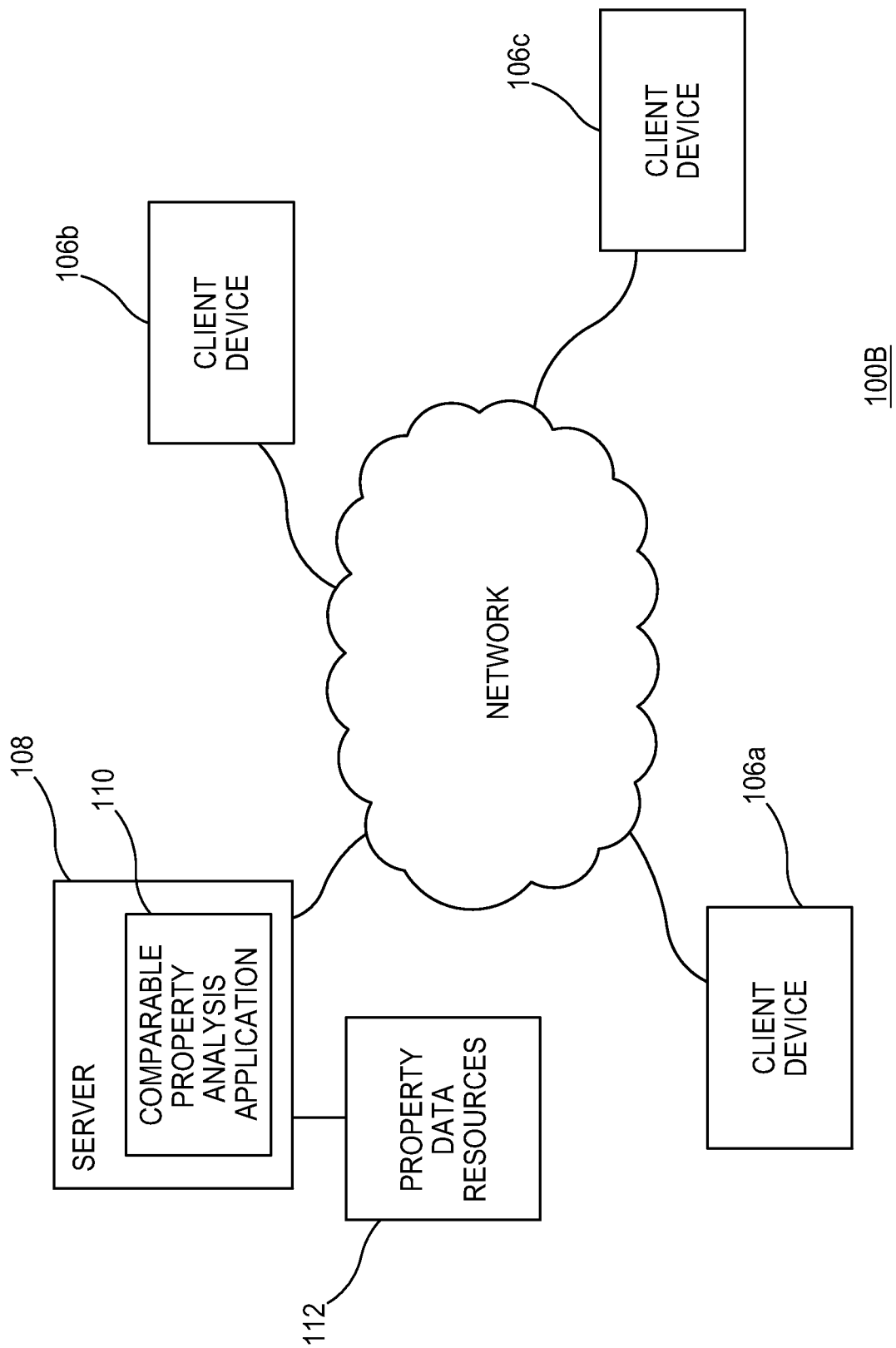

In the following description, for purposes of explanation, numerous details are set forth, such as flowcharts and system configurations, in order to provide an understanding of one or more embodiments of the present disclosure. However, it is and will be apparent to one skilled in the art that these specific details are not required in order to practice the present disclosure.

Real estate sales data collected around condominium projects is not well defined and is often not carefully recorded. Project names and boundaries are often referred to inconsistently. Because of these and other data inconsistencies, defining neighborhood for condominium comparables can be more problematic than for detached single-family subject properties. But for purposes of identifying comparable sales and quantifying location effect, proper identification of condominium projects is necessary. Units in the same project will have the same quality of construction, architectural style, exterior condition, shared recreational facilities, and other amenities. Typically, a geographic area such the Census Block Group (CBG) may be used for a geographic fixed effect. While this may be sufficient for single family home automated valuation and appraisal analysis, it is over-inclusive with respect to condominium assessment. According to one aspect of this disclosure, the condominium project is substituted a location fixed effect variable for modeling comparable properties. In this fashion, the granularity of the variable operates at the condominium project level and better encapsulates the level of similarity that comparables within a common project should have, in lieu of somewhat geographically close properties that do not belong to the same project.

According to another aspect, the present disclosure offers techniques for properly determining which properties belong to each identified condominium project, and for continuously updating property data to have accurate and easily ascertainable records for identifying the membership of condominium projects. Because the appraisal form data that pertains to condo project identification is often inconsistent or incomplete, this aspect uses multiple methods and multiple sources of information to determine the boundaries of a condo project.

Much of a home's value depends on neighborhood. The term neighborhood implies that a set of local amenities, characteristics, and qualities are shared by or common to different properties that constitute the neighborhood, including many not specifically listed on the appraisal, and in particular externalities like schools, crime rate, and noise level, among others).

Appraisers using the sales comparison approach to real estate valuation identify comparable sales within the geographic area they define as the neighborhood. When the neighborhood is defined incorrectly, inaccurate valuation occurs. Appraisers either miss relevant comparable sales that would be included in a correctly-defined neighborhood, or they include irrelevant comparables sales from other neighborhoods, or both.

When the subject is a condominium, the definition of neighborhood is significant to locating relevant comparable sales for a number of reasons. Condominium projects share amenities, such as fitness and recreation facilities, parking, security, and the like, the quality of which can vary dramatically from one to another. Construction quality, condo unit amenities, floor plans, and fees are often highly uniform within a project, but can differ substantially from project to project.

Due to these same-project similarities, the sales comparison approach should be very successful in assessing property valuation. However, because condominium developers provide a number of different types of condo projects, often in close proximity and with similar names, identifying comparables for a condo subject can present unusual difficulties, particularly for a model-based approach without local knowledge.

In the condominium space, the smallest unit of neighborhood is the project, which depending on the development, can consist of a single high rise tower, a number of towers, a collection of mid-rise buildings, or a sprawl of semi-attached or detached low rise or even single-unit properties.

The following kinds of typical condo projects serve as examples:

The single monolithic condo tower. In this project the entire condo project has a single root address and the units are distinguished by unit numbers. The algorithm is most successful at identifying comps for this neighborhood.

The single garden-style building (roughly 4 to 8 units). While these units are similar, because there are very few units in the project, the likelihood of finding many comparable sales for a single property within the project is reduced.

A set of detached condo buildings, each of which may or may not contain multiple units. Street address conventions differ; in some cases there may be a limited number of root addresses with unit numbers, while in others the units have distinct house numbers that make the condo project indistinguishable from a neighborhood of single family homes. The diffuse nature of this last project type makes it very difficult to identify the borders of the condo project to define as its neighborhood.

According to one aspect, a method and system for evaluating condominium appraisals first provides accessible and updatable property data that accurately identifies the condominium properties that belong to each identified condominium project. In one example, access is made to project name descriptors that are typically supplied by appraisers on appraisal forms (e.g., 1073) for subject and comparable properties are accessed, along with construction date, street address, and geo-location information. This information is used to define mutually exclusive sets of collocated condominiums that are identified by multiple appraisers as being located within the same project.

Where data quality is reliable, these mutually exclusive sets of condos correspond very closely to projects. A corresponding automated valuation model, such as those described herein, can then base their selection criteria on project, and condos that share a given identified project can be treated in modeling as sharing a common project fixed effect, separate from a geographic fixed effect that might be shared by properties in the same part of town or in proximity to a neighborhood amenity or recreational feature.

A condo project can be loosely understood as a set of condominium properties, identified by street address, that share a common legal project name, were constructed within a short time span, and are located within the same immediate geographic area.

The appraisal form data is typically not in itself sufficient for automated determination of the membership of properties within condo projects. For example, the legal project name supplied by appraisers on the 1073 form allow for the entry of free, unstandardized text, which allows different appraisers to abbreviate and shorten the same project name in countless ways. Beyond that, appraisers can be inaccurate about project identification, and often disagree about the legal name of a given project. According to another aspect, this disclosure offers techniques for scrubbing and standardizing the supplied project names in order to match condominiums to the correct project, and chooses the most commonly used project name to avoid the overmatching that would otherwise be caused by appraiser inaccuracies or scrubbing errors.

A dynamic algorithm is thus provided to identify the project to which a particular condominium unit belongs. When the limits of a condo project are poorly defined in the appraisal data, ambiguous neighborhood designations are overcome through algorithmic calculations that select a cohesive project identifier.

A condo project may be defined as a set of condominium properties that share a common legal project name, were constructed within a few years of one another (to differentiate phases), and are located within the same census block group (CBG). However, when appraisal data is missing, incomplete, or contradictory, the invention seeks to use a multiplicity of data to define the limits of a single project.

An infilling logic may also be used to determine that a property should be included as a member of a condo project when it is not otherwise indicated. For example, if 123 and 127 Main Street are in project X, then 125 Main street may also be determined to be a member. However, if 123 and 127 Main street are both assigned to project X and 125 Main street is assigned to project Y, then it is determined that at least one of the assignments is incorrect.

A lumping algorithm also helps to determine condo project membership. The lumping algorithm identifies enclosed buildings as part of a given project. For example, when the two adjacent addresses 4 Main Street and 2 Main Street are both designated as "The Gables" properties at those addresses are determined to be part of the same project.

A year-built constraint is also implemented, and helps to overcome issues of project phases that tend to mistakenly place project construction phases outside the project in which they were created.

Fuzzy logic is also applied, to filter out unhelpful appraisal project names like "unknown," "N/A," and "not available." Bad data is excluded from the set of possible valid project names.

Algorithmic regressions are also applied to match various possible project names to various condominium buildings, phases, addresses, and detached structures.

Other subject project data fields, like the number units in project, may also be used to find project boundaries.

Although condo and single family properties are fundamentally similar in that they are both dwelling spaces, it would not be accurate to think of a condo as equivalent to a single family residence without a lot. From an automated valuation perspective, there are a number of differences beyond the absence of a lot size that justify the creation of a separate model for condo properties.

For one, as condo projects inherently contain multiple units, there is a built-in comparable sales pool for a condo subject that does not necessarily exist for single family residences. Within the condo project, a number of the unobserved characteristics should be roughly homogenous throughout, so the value obtained through adjusting these comp properties toward the subject should be more reflective of reality than when properties that are dissimilar in terms of the unobserved characteristics are adjusted towards the subject.

Additionally, condo properties tend to be concentrated in particular parts of a broad housing market (e.g., U.S. housing market), particularly in densely populated urban areas. In these areas there is a tendency to have more accurate data as more populous counties have strong incentives to keep all of their records digitally, which typically translates into higher quality data being passed along to the data aggregation companies. In addition, in certain urban environments there is richer data on things such as dining and entertainment points of interest, public transportation, and the distance to the central business district or commuter hub. According to one aspect, embodiments of the condo model described herein exploit this richer data through GIS analysis and other methods in order to enhance the accuracy of the condo model along dimensions that are not relevant to the single family model at large.

Accordingly, consistent with an embodiment of the present disclosure, modeling appropriate comparable properties for the assessment of appraisals entails accessing a property dataset, wherein subsets of properties represented in the property data are determined to be members of respective condominium projects. These determinations are scrubbed and updated periodically to ensure that the dataset is accessible for accurate and consistent identification of those properties that belong to each identified condominium project.

Various techniques are disclosed for identifying candidate condo properties. Determination factors include source of information, duration and consistency of identification as condo, identification of root address identifiers deemed to correspond to condo projects, year-built, etc. Following initial scrubbing and standardization of the property data, the condo project identification information is then further refined using one or more of geographic constraints, year-built constraints, filtering of invalid names, and algorithmic regression.

An automated valuation model is applied to the data. Preferably, a hedonic regression is applied to the property data, the regression modeling the relationship between price and explanatory variables. Among these explanatory variables is a "condominium project" variable that is preferably a location fixed effect variable. That is, the respective condominium projects are respective delineations (values) for the "condominium project" location fixed effect variable.

In typical application, an appraisal for a subject condominium property that identifies corresponding appraiser-identified comparables is analyzed. For the same subject property, model-identified comparables are determined to correspond to the subject condominium property using results of the hedonic regression, including the condominium project variable.

Following this, an evaluation of the appraisal may be made, either by comparing the appraiser-identified comparables to the model-identified comparables or by reviewing the characteristics of individual appraiser-chosen comparables, or both.

Refinements to the modeling may include determining a set of value adjustments for comparable properties based upon differences in the explanatory variables between the subject condo property and comparable properties, as well as determining an economic distance between the subject condo property and comparable properties, where the economic distance is constituted as a quantified value determined from the value adjustments.

Weighting, ranking and displaying of the comparable properties on a map image may also be performed based upon their appropriateness as comparables for the subject condo property. The weighting and corresponding ranking may be based upon the economic distance from the subject condo property and other factors (e.g., geographic and temporal distance).

(i) Hedonic Equation

Although various models may be used to generate the model-chosen comparable properties, one example of a hedonic equation is described below.

In the hedonic equation, the dependent variable is sale price and the explanatory variables can include the physical characteristics, such as gross living area, age, number of bedrooms, number of bathrooms, as well as non-physical characteristics, such as condo fees and common elements (amenities) and location specific effects, time of sale specific effects, and property condition effect (or a proxy thereof). This is merely an example of one possible hedonic model. The ordinarily skilled artisan will readily recognize that various different variables may be used in conjunction with the present disclosure.

In this example, the dependent variable is the logged sale price. The explanatory variables are:

(1) Four continuous property characteristics:

(a) log of gross living area ("GLA"), (b) log of Age ("Age"), (c) Number of Bathrooms ("bath");

(d) HOA/Condo Fees ("fees"), and (2) Five fixed effect variables:

(a) Number of Bedrooms ("BED");

(b) location fixed effect (i.e., by Condo Project, "CPr");

(c) Time fixed effect (e.g., measured in calendar quarters counting back from the estimation date);

(d) Foreclosure status fixed effect ("FCL"), which captures the maintenance condition and possible REO discount; and (e) a "GIS" or Graphical Information Systems variable pertinent to proximity (e.g., bordering) a particular geographical feature of interest.

In one example, the GIS feature may be a body of water, such the ocean, with ocean front condos enjoying enhanced valuation. However, as noted above, condo properties tend to be concentrated in particular parts of a broad housing market (e.g., U.S. housing market), particularly in densely populated urban areas. In these areas there is a tendency to have more accurate data as more populous counties have strong incentives to keep all of their records digitally, which typically translates into higher quality data being passed along to the data aggregation companies. In addition, in certain urban environments there is richer data on things such as dining and entertainment points of interest, public transportation, and the distance to the central business district or commuter hub. Any number "N" of such different features are determined and accommodated by the condo comp model. Thus, these additional GIS features of interest are also among those implemented by the model.

With the above variables, an example equation (Eq. 1) is as follows:

$$\ln(p) = \beta_{gla} \cdot \ln(GLA) + \beta_{age} \cdot \ln(AGE) + \qquad \text{(Eq. 1)}$$
$$\beta_{bath} \cdot BATH + \sum_{h=\{0,1,2,3+\}} BED_h + \beta_{fees} \cdot FEES +$$
$$\sum_{i=1}^{N_{CPr}} LOC_i^{CPr} + \sum_{j=1}^{N_{QTR}} TIME_j + \sum_{k=\{0,1\}} FCL_k + \sum_{l=1}^{N_{GIS}} GIS_l + \varepsilon$$

The above equation is offered as an example, and as noted, there may be departures. For example, months may be used in lieu of quarters, or other periods may be used regarding the time fixed effect. These and other variations may be used for the explanatory variables.

Additionally, although the county may be used for the relatively large geographic area for which the regression analysis is performed, other areas such as a multi-county area, state, metropolitan statistical area, or others may be used. Still further, some hedonic models may omit or add different explanatory variables.

(ii) Exclusion Rules

Exclusion rules may be used to narrow the pool of comps to exclude properties that are determined to be insufficiently similar to the subject.

A comparable property should be located in a relative vicinity of the subject and should have been sold relatively recently; it should also be of similar size and age. The "N" comparables that pass through the exclusion rules are used for further analysis and value prediction.

For example, the following rules may be used to exclude comparables pursuant to narrowing the pool:

(1) Neighborhood: comps must be located in the Census Tract of the subject or its immediate neighboring tracts;

(2) Time: comps must be sales within twelve months prior to the effective date of appraisal or sale;

(3) GLA must be within a defined range, for example:

$$\frac{2}{3} \le \frac{GLA_S}{GLA_C} \le \frac{3}{2}$$

(4) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(5) HOA/Condo similarity is market specific, as the maintenance obligations of condo associations may vary greatly from area to area. In one example, the exclusion rule is based on the HOA/Condo fee per square foot, and a given property is excluded if the comps HOA/foot is less than half of the subject's or more than double. Alternatively, the following exclusion rule may be applied:

0.5<=(Subject HOA per SQfoot/Comp HOA per SQfoot)<=2.0

It should be understood that certain markets have very low HOA fees and in these situations the example provided above filters too often. In some embodiments it may be preferable to omit the exclusion rule related to condo fees where the geographical area (e.g., county) has an average less than a threshold amount (e.g., $100, or alternatives depending upon the market).

These exclusion rules are provided by way of example. There may be a set of exclusion rules that add variables, that omit one or more the described variables, or that use different thresholds or ranges.

(iii) Adjustment of Comps

Given the pool of comps selected by the model, the sale price of each comp may then be adjusted to reflect the difference between a given comp and the subject in each of the characteristics used in the hedonic price equation.

For example, individual adjustments are given by the following set of equations (2), where CV is a generalized representation of the continuous variables and FE is a generalized representation of the fixed effect variables, the S subscript represents the subject, and the C subscript represents the comparable:

$$A_{CVi} = \exp[(\ln(CVi_S) - \ln(CVi_C)) \cdot \beta_{CVi}];$$

$$A_{FEj} = \exp[(FEj_S - FEj_C)]; \quad \text{(Eq. 2)}$$

The specific coefficients $\beta_{gla}$, $\beta_{age}$, $\beta_{bath}$, $\beta_{fees}$, BED, GIS, CPr, TIME, FCL are obtained from the hedonic price equation described above. Hence, the adjusted price of the comparable sales is summarized as:

$$p_C^{adj} = p_C \cdot \prod_{i \in \{gla, age, bath, fees\}} CV_i \cdot \prod_{i \in \{bed, GIS, CPr, time, fcl\}} FE_j = \quad \text{(Eq. 3)}$$

$$p_C \cdot ADJ_{TOTAL}$$

(iv) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i \in \{gla, age, bath, bed, fees, cpr, time, fcl, gis\}} (A_i - 1)^2} \quad \text{(Eq. 4)}$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

Properties more similar to the subject in term of observed characteristics, location, and time of sale are considered better comparable sales (e.g., since fewer adjustments to the observed comp transaction price are required), and hence are given more weight in the prediction of the subject property value. Additionally, as a condo property is by definition a single unit within a larger structure, the other properties within the structure or condo project are going to share a number of unobserved characteristics with the subject property that outside comps may not have in common. Accordingly, the modeling preferably includes a comp weight that is inversely proportional to the economic distance, geographic distance and the age of sale, along with a special adjustment "PROJ" (where PROJ>1) to comparable sales that are determined to be from the same building or project as the subject in order to increase the weight of such comps with respect to the subject property. For example, comp weight may be defined as:

$$w_C = \frac{1 \cdot PROJ}{D_{SC}^{eco} \cdot D_{SC}^{geo} \cdot dT_{SC}} \quad \text{(Eq. 5)}$$

where $D_{geo}$ is a measure of a geographic distance between the comp and the subject, defined as a piece-wise function:

$$D_{SC}^{geo} = \begin{cases} 0.1 & \text{if} \quad d_{SC} < 0.1 \text{ mi} \\ d_{SC} & \text{if} \quad 0.1 \text{ mi} \leq d_{SC} \leq 1.0 \text{ mi} \\ 1.0 + \sqrt{d_{SC} - 1.0} & \text{if} \quad d_{SC} > 1.0 \text{ mi} \end{cases} \quad \text{(Eq. 6)}$$

dT is a down-weighting age of comp sale factor $$dT_{SC} = \begin{cases} 1.00 & \text{if} \quad (0, 90] \text{ days} \\ 1.25 & \text{if} \quad (90, 180] \text{ days} \\ 2.00 & \text{if} \quad (180, 270] \text{ days} \\ 2.50 & \text{if} \quad (270, 365] \text{ days} \end{cases} \quad \text{(Eq. 7)}$$

and PROJ is the special adjustment to comparable sales determined to be from the same building or project as the subject property, in order to increase the weight of those comparables as comparables to the subject property. This value will depend upon the specific market as well as degree to which the controls in the model (which may progress to include additional variables) accurately reflect the differences between the subject and the comparable properties. In one example, estimating an in-building weight for the Miami market, a value of PROJ=1.3 (up weighting properties from the same building/project by 30%) was determined to provide the best fit. It should be noted that the ideal PROJ weight is not independent of the other controls in the model, and as additional meaningful controls are added one should expect the optimal value of PROJ to decline. Theoretically, if a model were to fully control for all differences between the subject and comparable properties, then by the properties of OLS regression, the optimal PROJ value would be 1.

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \quad \text{(Eq. 8)}$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(v) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The overall list of comparable properties includes, of course, the model-chosen comparable properties. The overall list may also include all of the appraiser-chosen comparables if they are to be reviewed.

According to another aspect, mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

For example, mapping features include the capability to display the boundaries of census units, school attendance zones, neighborhoods, as well as statistical information such as median home values, average home age, etc.

The grid/table view allows the user to sort the list of comparables on rank, value, size, age, or any other dimension. Additionally, the rows in the table are connected to the full database entry as well as sale history for the respective property. Combined with the map view and the neighborhood statistics, this allows for a convenient yet comprehensive interactive analysis of comparable sales.

With further reference to the figures, examples of environments and particular embodiments implementing the ranking and displaying of comparable properties are now further described.

FIGS. 1A-B are block diagrams illustrating examples of systems 100A-B in which a comparable property analysis application operates.

FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d may communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 110 are typically accessed externally for use by the comparable property analysis application, since the amount of property data is rather voluminous, and since the application is configured to allow access to any county or local area in a very large geographical area (e.g., for an entire country such as the United States). Additionally, the property data resources 110 are shown as a singular block in the figure, but it should be understood that a variety of resources, including company-internal collected information (e.g., as collected by Fannie Mae), as well as external resources, whether resources where property data is typically found (e.g., MLS, tax, etc.), or resources compiled by an information services provider (e.g., LexisNexis).

The comparable property analysis application accesses and retrieves the property data from these resources in support of the modeling of comparable properties as well as the rendering of map images of subject properties and corresponding comparable properties, and the display of supportive data (e.g., in grid form) in association with the map images.

Figure 2:
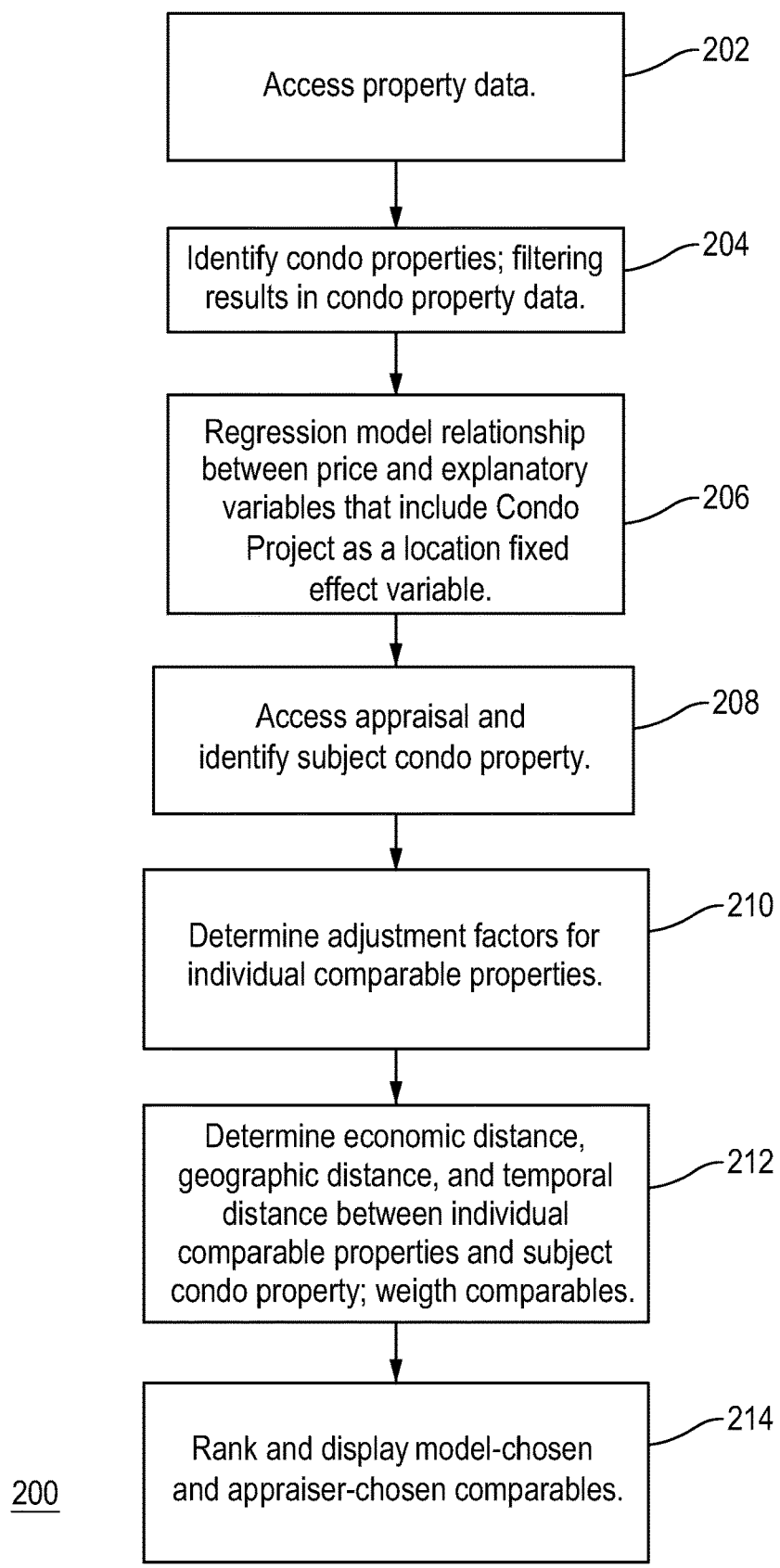
FIG. 2 is a flow diagram illustrating an example of a process for modeling comparable properties.

FIG. 2 is a flow diagram illustrating an example of a process 200 for modeling comparable properties, which may be performed by the comparable property analysis application.

As has been described, the application accesses 202 property data. This may be tailored to a geographical area of interest in which a subject property is located (e.g., county). Additionally, from the property data, an initial filtering to identify 204 condo property data may be applied. The identification of condo properties is described further below, such as with reference to FIG. 5.

Still referring to FIG. 2, a regression 206 modeling the relationship between price and explanatory variables is then performed on the accessed data. The explanatory variables include, at least, a variable for Condo Project wherein the Condo Project variable functions as a location fixed effect variable. Although various alternatives may be applied, a preferred regression is that described above, wherein the explanatory variables are the four property characteristics (GLA, lot size, age, number of bathrooms) as well as the categorical fixed effects (Condo Project as a location fixed effect, time, and foreclosure status).

Typically, the regression model will be applied in the context of evaluating appraisals. As an example, an appraisal identifies a subject property and lists several appraiser-identified comparables. The information in the appraisal may be originated from a form from which the system automatically extracts the relevant data. The appraisal information is accessed 208 and the subject property is identified accordingly.

The regression model may be used to evaluate any of the appraiser-chosen comparables, by providing an assessment of the differences between the subject property and any given appraiser-chosen property using the explanatory variables. The regression model may also be used to generate a list of model-chosen comparable properties. This model-chosen listing of comparables may include one or more of the appraiser-chosen properties, and may also be used to evaluate the appraisal and/or individual appraiser-chosen comparable properties.

In determining the model-chosen comparables, exclusion rules may be applied as noted above. A set of adjustment factors is also determined 210 for each potential comparable property. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 210, the economic distance, geographic distance and temporal distance between the subject property and respective individual comparable properties is determined 212. The economic distance is preferably constituted as a quantified value representative of the estimated price difference between the two properties as determined from the set of adjustment factors for each of the explanatory variables.

Following determining of the economic distance, the comparable properties are weighted in support of generating a ranking and displaying 214 of the comparable properties according to the model. This listing may be referred to as the model-chosen comparable properties, but it could of course include one or more of the appraiser-chosen comparable properties. In this fashion, the ranking illustrates where among the listing of model-chosen comparable properties the appraiser-chosen comparable properties respectively rank.

Figure 3:
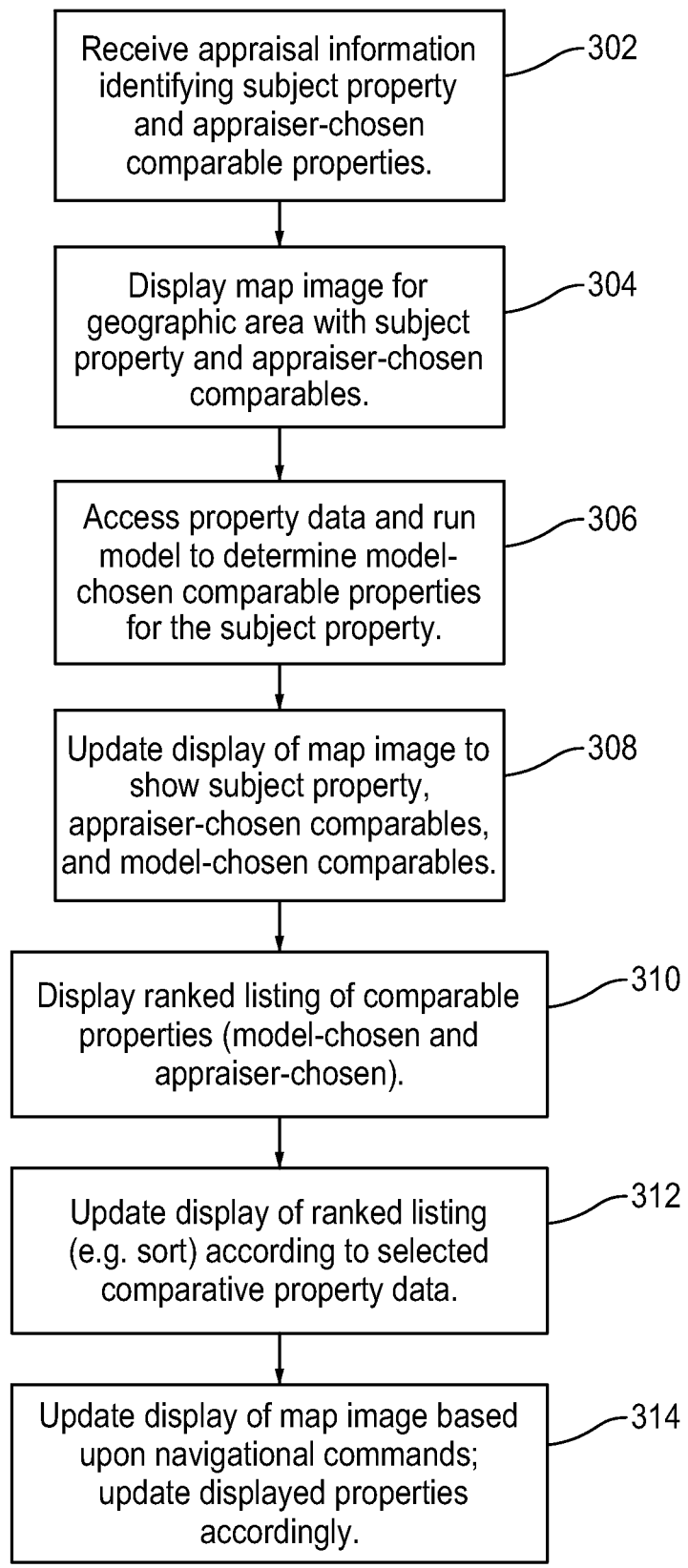
FIG. 3 is a flow diagram illustrating an example of a method for ranking and displaying appraiser-chosen comparable properties.

FIG. 3 is a flow diagram illustrating an example of a method 300 for ranking and displaying appraiser-chosen comparable properties.

The method 300 may initiate with receiving 302 appraisal information identifying a subject property and corresponding appraiser-chosen comparable properties. This appraisal information will often be accessible through a variety of data resources for appraisal reports, which list a relatively short list of comparable properties deemed appropriate for a subject property by an appraiser. Although typically human appraisal reports will be accessed and assessed, any type of appraisal information resource may be accessed and assessed. The appraisal information may be organized in a database, with access to external databases, with a search and retrieval functionality that may be based upon source, date, identification number or other criteria.

Once a set of appraisal information is chosen, the subject property and corresponding appraiser-chosen comparables may be displayed 304 on a map image with indicators showing the subject property and the locations of the comparables. This map image may be acquired from conventional mapping resources, including but not limited to Google maps and the like. Additionally, conventional techniques may be used to depict subject and comparable properties on the map image, such as through determination of the coordinates from address information.

The map imagery may be updated to provide user-desired views, including zooming in and out to provide more narrow or broad perspectives of the depictions of the comparable and subject properties. In addition to the map image, a corresponding grid of comparative property data concerning the listed properties may be concurrently displayed.

The property data includes information as to the location of the properties, and either this native data may be used, or it may be supplemented, to acquire the exact location of the subject property and potential comparable properties on the map image. This allows the map image to be populated with indicators that display the location of the subject property and the comparable properties in visually distinguishable fashion on the map image. The number of comparable properties that are shown can be predetermined or may be configurable based upon user preferences. The number of comparable properties that are shown may also update depending upon the level of granularity of the mage image. That is, when the user updates the map image such as by zooming out to encompass a wider geographical area, when the map image updates additional comparable properties may be rendered in addition to those rendered at a more local range.

The user may also prompt a particular comparable property to be highlighted, such as by cursor rollover or selection of an entry for the comparable property in a listing. When the application receives an indication that a property has been selected, it is highlighted in the map. Conversely, the user may also select the indicator for a property on the map image, which causes display of the details corresponding to the selected property.

At this stage, the appraiser-chosen comparable properties may be thoroughly assessed based upon review of the map image and the corresponding comparative property data for the appraiser-chosen comparables. However, a model-chosen listing of comparable properties is also preferably generated and depicted for further comparison to and assessment of the appraiser-chosen comparable properties.

Initially, this entails accessing property data and running a model (306) to determine model-chosen comparable properties for the subject property. In one example, the model may be the described hedonic regression performed at a geographic level (e.g., county) sufficient to produce reliable results. As set forth in further detail above, the described model identifies a pool of comparables, determines adjustments for each comparable using adjustment factors drawn from the regression analysis, derives an economic distance between each comparable and the subject property, and weights the comparables according to the economic distance between the comparable and the subject property. This weighting can be used to determine a ranked listing, with the highest weighting being the closest-ranked comparable, and so on. Although the particulars of one model are described herein, it should be understood that alternative particulars may be implemented according to the present disclosure.

The model produces a set of model-chosen comparable properties. The map image display is preferably updated 308 to indicate not only the subject property and the appraiser-chosen comparables, but also the additional model-chosen comparables. Preferably, the subject property, appraiser-chosen comparables and model-chosen comparables are depicted using different indicators, so that the user can identify the different properties and their locations on the map image. If necessary, the map image may automatically adjust for this update, such as in situations where a wider area is needed to concurrently depict the subject, appraiser and model-chosen comparables properties.

The listing of comparative property data is also updated 310 to display the ranked listing of the model-chosen comparable properties. This ranked listing will include both appraiser-chosen comparable properties, depending upon where they fall in the ranking, as well as model-chosen comparable properties that were not selected by the appraiser. The ranked listing provides an immediate indication as to how appropriate the model indicates the appraiser-chosen comparable properties to be as comparable for the subject property.

As with the listing before the update, the list may be variously updated 312 to sort and review the comparative data for the listed properties, for "drill down" assessment of the appropriateness of the appraiser-chosen comparable properties. Preferably, the listing is concurrently displayed with the map image to highlight location of selected properties while they are being reviewed.

Additionally, the map image may be further updated 314 to assess geographical areas at various levels of granularity (e.g., zoom in upon the neighborhood of the subject property, or zoom out to review potential comparable properties for a broader geographical area). The map image updates accordingly, both as to the map image and the inclusion of indicators for the subject and comparable properties.

Figure 4:
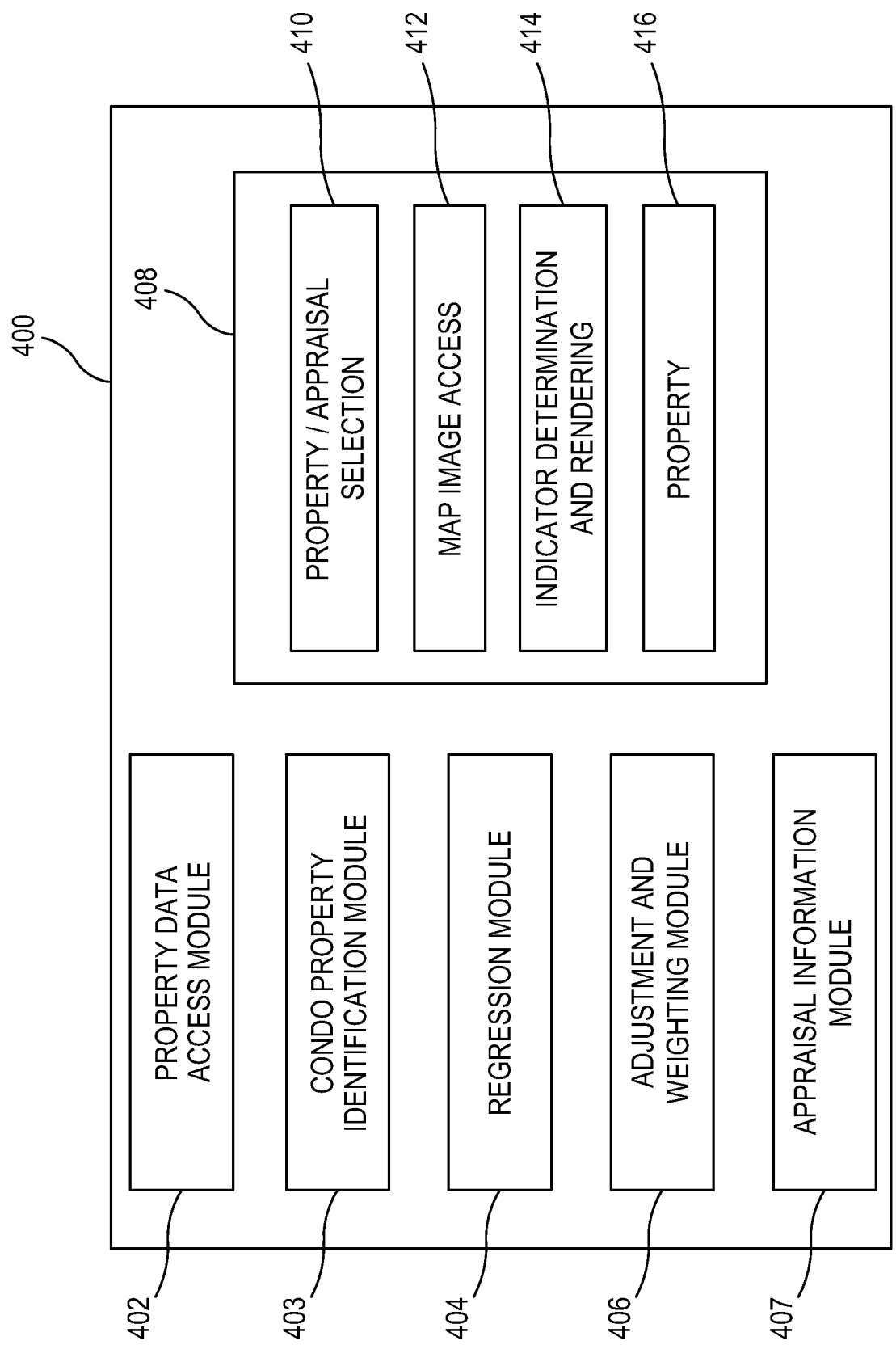
FIG. 4 is a block diagram illustrating an example of a comparable property analysis application.

FIG. 4 is a block diagram illustrating an example of a comparable property analysis application 400. The application 400 preferably comprises program code that is stored on a computer readable medium (e.g., compact disk, hard disk, etc.) and that is executable by a processor to perform operations in support of modeling and mapping comparable properties.

According to one aspect, the application includes program code executable to perform operations of accessing property data corresponding to a geographical area, and performing a regression based upon the property data, with the regression modeling the relationship between price and explanatory variables. A subject property and a plurality of comparable properties are identified, followed by determining a set of value adjustments for each of the plurality of comparable properties based upon differences in the explanatory variables between the subject property and each of the plurality of comparable properties. An economic distance between the subject property and each of the comparable properties is determined, with the economic distance constituted as a quantified value determined from the set of value adjustments for each respective comparable property. Once the properties are identified and the adjustments are determined, there is a weighting of the plurality of comparable properties based upon the appropriateness of each of the plurality of comparable properties as comparables for the subject property, the weighting being based upon one or more of the economic distance from the subject property, geographic distance from the subject property, and age of transaction.

The application 400 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The application 400 also includes program code for ranking and displaying comparable properties. Appraisal information is accessed, so as to identify a given subject property and corresponding appraiser-chosen comparable properties for the subject property. The modeling functionality previously described determines a plurality of model-chosen comparable properties based upon the appropriateness of each of the plurality of comparable properties as comparables for the subject property. Thereby, a map image corresponding to the geographical area is displayed, as well as indicators on the map image indicative of the subject property, at least one of the plurality of appraiser-chosen comparable properties, and at least one of the model-chosen comparable properties. In addition to the map image, the application 400 determines the ranked listing of comparable properties including the plurality of model-chosen comparable properties and the plurality of appraiser-chosen comparable properties, and displaying the ranked listing of comparable properties concurrently with the map image, such as in the described grid form.

The comparable property analysis application 400 is preferably provided as software, but may alternatively be provided as hardware or firmware, or any combination of software, hardware and/or firmware. The application 400 is configured to provide the comparable property modeling, appraisal results comparing and corresponding mapping functionality described herein. Although one modular breakdown of the application 400 is offered, it should be understood that the same functionality may be provided using fewer, greater or differently named modules.

The example of the comparable property analysis application 400 of FIG. 4 includes a property data access module 402, condo property identification module 403, regression module 404, adjustment and weighting module 406, appraisal information module 407, and UI module 408, with the UI module 408 further including a property and appraisal selection module 410, map image access module 412, indicator determining and rendering module 414 and property data grid/DB module 416.

The property data access module 402 includes program code for carrying access and management of the property data, whether from internal or external resources. The condo property identification module 403 includes program code carrying out the process of identifying properties as condo or otherwise, via access to a corresponding database of condo information, external resources, and application of logic to carry out the identification of condos whether by trusted source and consistency analysis, geographic condo density analysis, condo project identification analysis, or the like, as described further below. The condo property identification module 403 applies these processes to filter the property data down to that determined to be condo properties, so that corresponding pools of comparables for a condo subject property may more appropriately include condo properties.

The regression module 404 includes program code for carrying out the regression upon the accessed property data, according to the regression algorithm described above, and produces corresponding results such as the determination of regression coefficients and other data at the country (or other) level as appropriate for a subject property. The regression module 404 may implement any conventional code for carrying out the regression given the described explanatory variables and property data.

The adjustment and weighting module 406 is configured to apply the exclusion rules, and to calculate the set of adjustment factors for the individual comparables, the economic distance, and the weighting of the comparables.

The appraisal information module 407 may be a stand-alone database or may organize access to a variety of external databases of appraisal information. The appraisal information is typically in the form of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 408 manages the display and receipt of information to provide the described functionality. It includes a property and appraisal selection module 410, to manage the interfaces and input used to identify one or more subject properties and corresponding appraisal information. The map image access module 412 accesses mapping functions and manages the depiction of the map images as well as the indicators of the subject property and the comparable properties. The indicator determination and rendering module 414 is configured to manage which indicators should be indicated on the map image depending upon the current map image, the weighted ranking of the comparables and predetermined settings or user input. The property data grid/DB 416 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

Figure 5:
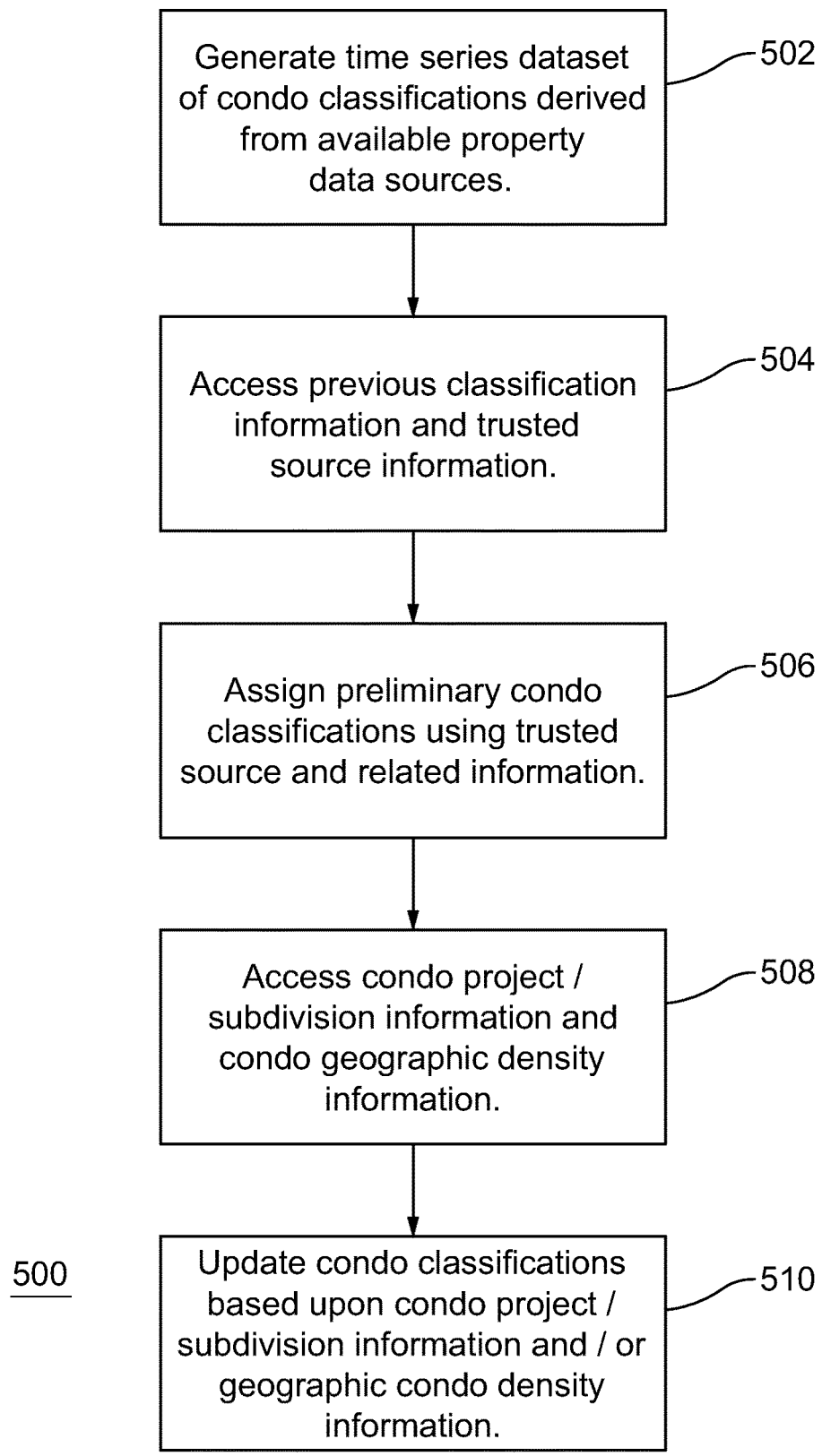
FIG. 5 is a flow diagram illustrating an example of a method for identifying condo properties in a property dataset.

FIG. 5 is a flow diagram illustrating an example of a method 500 for identifying condo properties.

The process includes generating 502 a time series dataset of condo classifications from the available property data sources, which may include DU submissions, MLS data, loan level records, deed records, tax records, and others. These data sources sometimes disagree with each other and even with themselves over time; however, some sources are significantly more reliable than others. For a given area a particular data source may be designated as a "trusted source", for example based on the results of data quality testing.

A database of condo classification is maintained, which includes various information including that identifying trusted sources of information, as well as existing classification information ("condo" or "not condo") for identified properties, information corresponding to condo projects and subdivisions, etc. This information is accessed 504, and a property is assigned 506 a preliminary classification (either "condo" or "not condo") and that assignment is further given a confidence level ("high," "medium," or "low") based upon the trusted source information and time series classification information. One example of the logic for determining a confidence level is as follows:

1. Where the classification data is from a current trusted source, and is consistent over time, the property classification is given a high confidence score.

2. Where classification data is not from a current trusted source, but is consistent among multiple alternative sources, with each other and over time, the property classification is given a high confidence.

3. Where the classification data is from a current trusted source, but varies over time or is missing in some instances, AND the data from the alternative sources is not consistent, the classification for the property is assigned based on the preponderance of the data, combined with logic based on the location of the property (condos tend to be concentrated in particular markets). When a property classification is assigned in this manner, it is given a medium or low confidence score based on the level of dispersion within and between sources, and the frequency at which condo properties are observed in the given area.

In this example, the preponderance refers to the single most well represented classification; depending on the number of classifications present in the data this might mean that there is no clear majority classification, but rather a largest minority. Additionally, in this context location refers to county or, in sparse counties, the MSA. Basically, in situations of ambiguity, the classification logic errs on the side of calling a property a condo if it is within a location with a lot of condos. If on the other hand the property is in an area where there are relatively few condos, then the logic errs on the side of not classifying the property as a condo.

After obtaining the preliminary property classification, the classification and confidence score may be adjusted as follows. In connection with this, additional information such as condo project/subdivision information and condo geographic density information is accessed 508, either in the maintained database, from the noted sources, or from other external resources.

The condo project/subdivision information may be identification of projects and subdivisions previously identified as condominium projects and subdivisions. In one example, a Root Identifier (ID) identifies a condo project. The Root ID is a piece of information that properties within a given condo project share. In one example, this may be a portion of the address that is common to all condo units within a condo structure. The condo geographic density information identifies the frequency with which condo projects reside in given geographical unit areas. Upon accessing this additional information, the condo classifications are updated 510 based upon this information (e.g., the condo/project subdivision information and/or the geographic condo density information). A specific example is as follows:

1. Properties may be considered to have two identification components, a general "Root ID" and a more specific "Unit Number." As noted, the Root ID is the portion of the address that is common to all units within the structure, while the unit number is any component of the address that is unique to a given unit within the property. For every individual property classified as a condo with high confidence, all other properties that share the same Root ID are classified as a condo with medium confidence. (Any individual property with the same Root ID that had previously been classified as a condo with high confidence would remain under the high confidence classification. In the case where a property is classified as non-condo with high confidence, but also shares the same root address as a condo with a high confidence score, we will put these records aside for further verification.

2. Sometimes in the transaction data does not discretely contain the Unit Number segment of the address for a given condo project, and consequently a specific Root ID is observed with an extremely high number of transactions since every unit that transacts is being mapped to the Root ID only. In this instance, the process identifies properties with high numbers of unique tax and/or sale records in the public data and then classifies them as condos if they are located in areas with a concentration of known condos that meets a predetermined threshold. The threshold may vary by market but in one example a concentration of at least 10% condos would satisfy the predetermined threshold. If the property is in an area that is not known to contain many condo properties than it can be quarantined for further verification.

3. Within particular suburban areas, subdivisions typically contain a number of different structures all of which were built at roughly the same time and by the same builder. Consequently, within homogenous areas as such, when a condo project is identified, it is often the case that the remainder of the subdivision consists of condo properties. Consequently, if a property within a subdivision is identified as a condo with high confidence, then all other properties within the subdivision are classified as a condo with medium confidence, provided that the property is located in an area with known condos, and all of the properties within the subdivision are of a very similar age. If the subdivision appears to contain a large number of unique Root IDs relative to the subdivision size, or the various properties do not appear to have been built within a couple of years of one another, then further verification may be required before assigning the condo designation to all of the properties within the subdivision.

Figure 6:
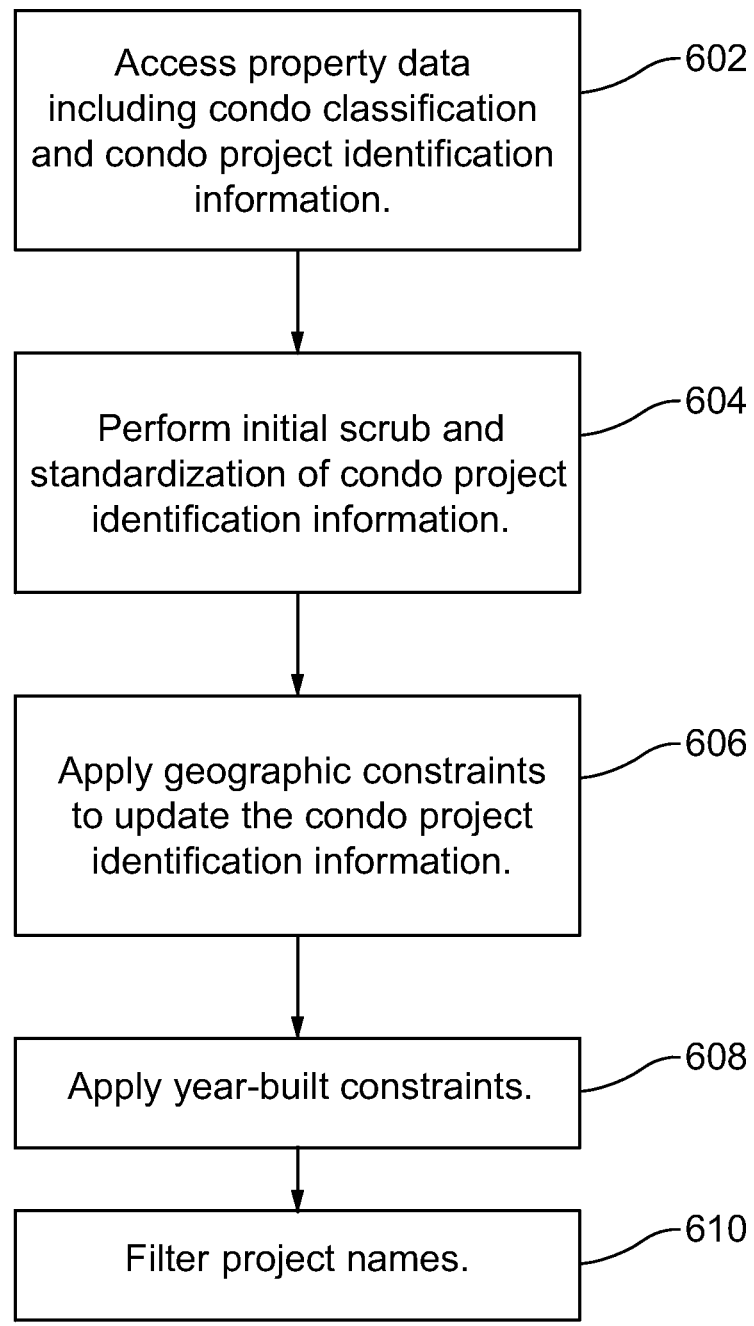
FIG. 6 is a flow diagram illustrating an example of determining condo project identification information and updating the same in the property dataset.

FIG. 6 is a flow diagram illustrating an example of determining condo project identification information and updating the same in the property dataset. In one example, the condo classification information and related data (including condo project identification information) may be initially determined using the process illustrated in FIG. 5. The property dataset is then accessed 602 so that the condo project information can be further updated.

A condo project can be loosely understood as a set of condominium properties, identified by street address, that share a common legal project name, were constructed within a short time span, and are located within the same immediate geographic area.

The appraisal form data is typically not in itself sufficient for automated determination of the membership of properties within condo projects. For example, the legal project name supplied by appraisers on the 1073 form allow for the entry of free, unstandardized text, which allows different appraisers to abbreviate and shorten the same project name in countless ways. Beyond that, appraisers can be inaccurate about project identification, and often disagree about the legal name of a given project. Accordingly, an initial scrubbing and standardizing of the existing condo project names is performed 604 in order to match condominiums to the correct project, and chooses the most commonly used project name to avoid the overmatching that would otherwise be caused by appraiser inaccuracies or scrubbing errors.

For practical purposes, a condo project may, for example, be defined as a set of condominium properties that share a common legal project name, were constructed within a few years of one another, and are located within the same census block group (CBG). However, appraisers often report an incorrect legal project name, perhaps substituting the name of the encompassing neighborhood or subdivision, or at times incorrectly identifying a comp as being part of a given project when it is not. Thus it has been necessary to develop a method to group condominium properties into the correct projects using a multiplicity of data to define the limits of a single project, Geographic constraints are applied 606 to improve and correct the condo project information. An infilling logic may be used to determine that a property should be included as a member of a condo project when it is not otherwise indicated. For example, if 123 and 127 Main Street are in project X, then 125 Main Street may also be determined to be a member. However, if 123 and 127 Main street are both assigned to project X and 125 Main street is assigned to project Y, then it is determined that at least one of the assignments is incorrect.

A lumping algorithm also helps to determine condo project membership in a geographic sense. The lumping algorithm identifies enclosed buildings as part of a given project. For example, when the two adjacent addresses 4 Main Street and 2 Main Street are both widely designated as "The Gables," properties at those addresses are determined to be part of the same project.

Year-built constraints are also applied 608. These constraints help to overcome issues of project phases that tend to mistakenly place project construction phases outside the project in which they were created.

One example of requirements is geographical proximity and year-built within a certain threshold (e.g., 5 years). However, there are condo projects that proceed in phases where the time period from the first phrase through the last phase spans more than 5 years. So when multiple appraisers reference "phase" in the project name, the 5-year requirement for that project can be loosened. A correlation between year built and each phase can also be verified. If condos in Phase 5, for instance, aren't generally constructed later than those in Phase 1, and other similar expected patterns fail to hold, it may be determined that the 5-year requirement should not be loosened.

Instead of using a flat 5-year rule in all cases, alternative approaches might use the mean and standard deviation of year built of the condo stock to dynamically determine a value for each tract or county. Thus the threshold would be higher in areas with slow condo development over a long time and lower in areas with rapid condo development booms.

The project names are filtered 610. For example, meaningless project names like "unknown," "N/A," and "not available" are filtered out. Bad data is excluded from the set of possible valid project names.

The filtering also preferably includes a process for grouping similar variations (including misspellings and multiple abbreviations) of project names, such as "The Woods of Tinley Bay," "Wds Tinley Bay," "Woods Tinley Bay," "The Woods of Tiney B.," and so on. In these cases, mathematical functions are used to calculate a lexical "distance" between spelling variants. Group names with a distance less than some value X may be grouped together as variants on the same name, preferably using geographical proximity and other factors as limiting/filtering values. These limitations help to avoid over-inclusion in the grouping; for example, to avoid grouping together everything in town with the word "Woods" in the project name. This grouping process is useful for cases where the project is not located at a single root address, where it is the approach most likely to result in a successful project identification.

Prior to application of the above-described grouping process, spelling may be standardized and corrected for common words such as "condos," "estates," "villas," "townhomes," etc., and common abbreviations are expanded, etc. This makes the project name strings as close as possible before the comparison is applied for the grouping process.

The filtering may also apply some interpretation of appraiser shorthand. If an appraiser writes "same" or "subject" as the project name of a comp, the application substitutes the subject's project name.

Finally, other subject project data fields, like the number units in project, may also guide the definition of the project. That is, if a given project is reported by multiple appraisers to have 90 units, then the project identified by the filtering process should contain no more than 90 units (but may contain fewer since not all will have been observed as the subject or as a comp on an appraisal form).

Figure 7B:
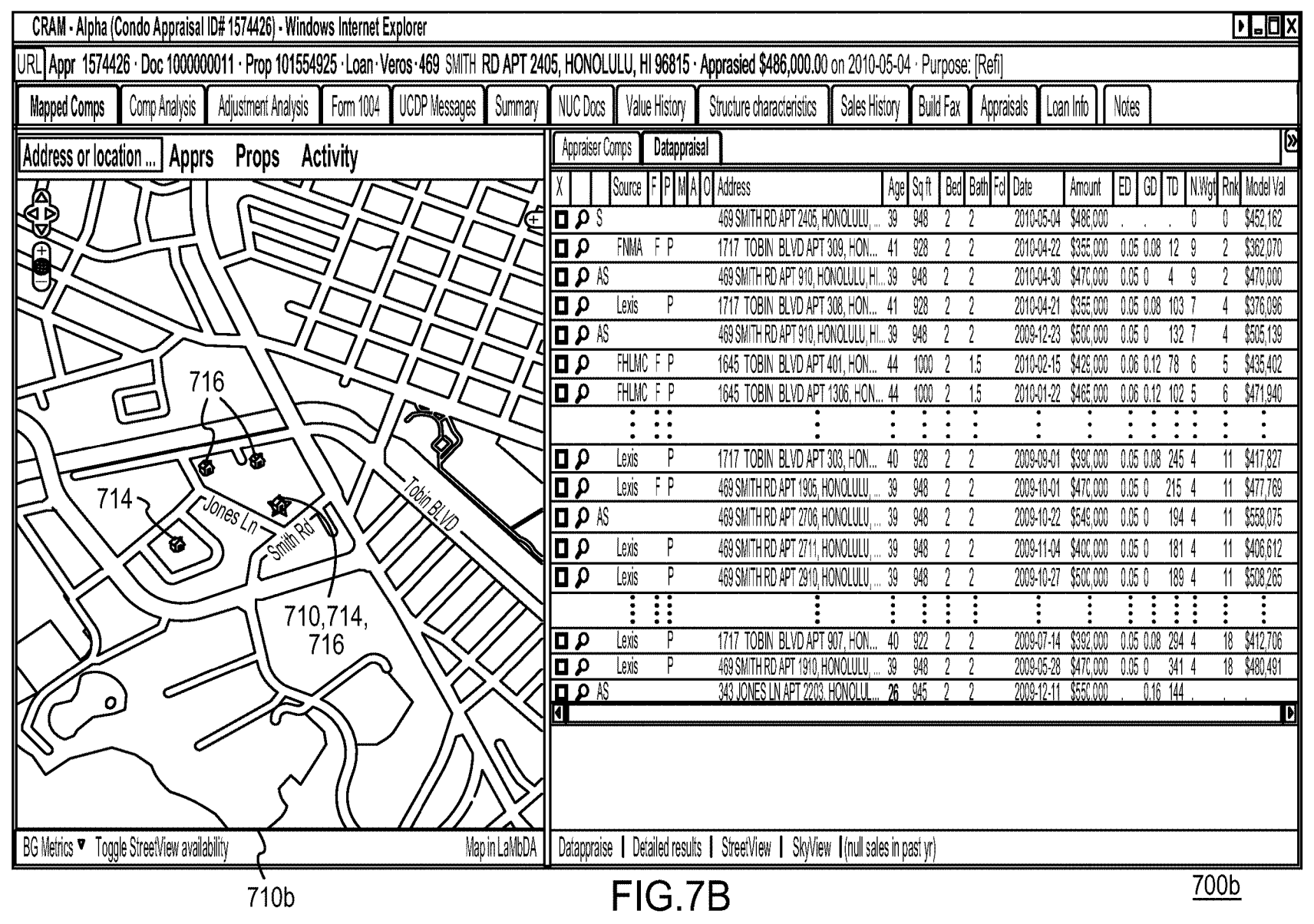

FIG. 7A is a display diagram illustrating an example of a map image 710a and corresponding property grid data 720a for a list of appraiser-chosen comparable properties, and FIG. 7B is a display diagram illustrating an example of a map image 710a and property grid data 720b updated to indicate appraiser-chosen comparable properties among a ranked listing of model-chosen comparable properties.

The map image 710a-b depicts a region that can be manipulated to show a larger or smaller area, or moved to shift the center of the map image, in convention fashion. This allows the user to review the location of the subject property 712 and corresponding comps 714, 716 at any desired level of granularity. This map image 710a-b may be separately viewed on a full screen, or may be illustrated alongside the property data grid 720a-b as shown.

The property grid data 720a-b contains a listing of details about the subject property and the comparable properties, as well as various information fields. The displayable fields may include an identifier field (e.g., "S" indicates the subject property, and "AS" indicates an appraiser-chosen comparable property), the source of data for the property ("Source"), the address of the property ("Address"), the square footage ("Sq Ft"), the lot size ("Lot"), the age of the property ("Age"), the number of bed and bathrooms ("Bed", "Bath"), the date of the prior sale ("Date"), the prior sale amount ("Amount"), the foreclosure status ("FCL", (not shown)), the economic distance ("ED"), geographic distance ("GD") and time distance ("TD", e.g., as measured in days) factors as described above, the weight ("N. Wgt"), the ranking by weight ("Rnk"), and the valuation as determined from the comparable sales model ("Model Val").

Initially, a user may navigate through an appraisal selection screen that allows the user to identify and select an appraisal report for a subject property. Once this report is selected, the map image 710a-b and property grid data 720a-b may be prompted accordingly, such that the subject property and the appraiser-chosen comparable properties are listed and displayed.

For example, FIG. 7A illustrates an example of a display screen 700a that concurrently displays a map image 710a and a corresponding property data grid 720a once an appraisal report for a subject property has been selected. As indicated in the property grid data, the listing identified as "S" is the subject property, and the listings identified as "AS" indicate appraiser-chosen comparable properties. The subject property 712 and appraiser-chosen comparable properties 714 are indicated in the map image as well. The model accommodates review of an appraisal that may have taken place previously.

With the condo comparable property model, often there will be multiple units corresponding to the same address. For example, the subject property 712 and some of the comparable properties 714 are at the same address and thus may be depicted via the same indicator.

The updated display screen 700b of FIG. 7B may be displayed following execution of the comparable property model, which identifies the comparable properties, determines adjustment factors, determines economic distance and weights the comparable properties, such as described above. At this point, the map image 710b is updated to include not only the subject property 712 and appraiser-chosen comparable properties 714, but also the model-chosen properties 716 that were not in the appraisal report. Again, there may be identical root addressing, and here the subject property, some of the appraiser-chosen comparable properties 714, and some of the model-chosen comparable properties are at the same building (root address).

Similarly, the property data grid 720b updates to include the model-chosen properties that were not in the appraisal report ("MS"). As illustrated, here, the model ranked the appraiser-chosen comparables as $2^{nd}$, $4^{th}$, $11^{th}$ and unranked (i.e., not top 20) among the properties it determined to be appropriate comparables. The listing also indicates the top 20 model-chosen comparable properties. Additionally, the map image 710b updatable to indicate relative geographical locations of the appraiser-chosen comparable properties 714 and the model-chosen properties 716. It should be noted that, due to the properties being located within the same condo project, there are typically fewer house icons perceived on the map image because they correspond to the same location on the map.

Further assessment of the data can be variously undertaken by the user. The map image 710 also allows the user to place a cursor over any of the illustrated properties to prompt highlighting of information for that property and other information. Additionally, the listing of comparables in the property grid data 720 can be updated according to any of the listed columns. The grid data can be variously sorted to allow the user to review how the subject property compares to the listed comparable properties.

Still further, the map image 710 can be divided into regions to help further assess the location of the subject property and corresponding properties. For example, the map image can be updated to indicate several Census Block Group (CBG) regions in the map image, along with trend or other data particular to each CBG. This helps the user to further assess how the subject property relates to the comparable properties, with the CBG acting as a proxy for neighborhood.

The user may variously update the map image and manipulate the property data grid in order to review and assess and subject property and the corresponding comparable properties in a fashion that is both flexible and comprehensive.

Thus embodiments of the present disclosure produce and provide methods and apparatus for modeling comparable properties where the subject property is a condominium property. Although the present disclosure has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for modeling appropriate comparable properties, the method comprising:

accessing, by a computing device, property data, wherein subsets of properties represented in the property data are determined to be members of respective condominium projects;

performing, by the computing device, a hedonic regression based upon the property data, the hedonic regression modeling the relationship between price and explanatory variables, the explanatory variables including a condominium project identifier variable that is arranged as a location fixed effect variable, such that respective instances of values of the condominium project identifier variable correspond to the respective condominium projects as respective instances of the location fixed effect variable;

retrieving, by the computing device, an appraisal for a subject condominium property that identifies corresponding appraiser-identified comparables;

determining, by the computing device, model-identified comparables corresponding to the subject condominium property using results of the hedonic regression;

evaluating, by the computing device, at least one of the appraiser-identified comparables using a comparison to the model-identified comparables or the results of the hedonic regression;

displaying a map image corresponding to a geographical area;

displaying indicators on the map image indicative of the subject condominium property along with at least one of the appraiser-chosen comparables and the model-chosen comparables; and receiving a zooming input operation and updating the display of the map image with an adjustment of the indicators displayed on the map image as a result of the zooming input operation.

2. The method of claim 1, further comprising:

prior to performing the hedonic regression, processing the property data to update membership of the subsets of properties in the respective condominium projects.

3. The method of claim 2, further comprising:

applying an infilling process to include a given property as a member of a given condominium project, the infilling process examining a relationship between the given property and other properties already determined to be members of the given condominium project.

4. The method of claim 2, further comprising:

determining standard names for the respective condominium projects and processing the property data to update records corresponding to the subsets of properties to include the standard names.

5. The method of claim 1, wherein determining members of the respective condominium projects comprises:

determining a source of the property data corresponding to a given candidate condominium property; and identifying the given candidate condominium property as a condominium property at a high confidence factor where the source is determined to be a trusted source and the identification of the candidate condominium property as a condominium property by the source consistently occurs over a given period of time.

6. The method of claim 1, wherein determining members of the respective condominium projects comprises:

identifying a root identifier that is determined to be common to a grouping of properties;

determining that the root identifier is associated with a given candidate condominium property that is otherwise determined to be a condominium property; and determining that other properties associated with the root identifier are condominium properties, based upon the determination that the given candidate condominium property is a condominium property.

7. A non-transitory computer readable medium storing program code for modeling appropriate comparable properties, the program code being executable by a processor to perform operations comprising:

accessing property data, wherein subsets of properties represented in the property data are determined to be members of respective condominium projects;

performing a hedonic regression based upon the property data, the hedonic regression modeling the relationship between price and explanatory variables, the explanatory variables including a condominium project identifier variable that is arranged as a location fixed effect variable, such that respective instances of values of the condominium project identifier variable correspond to the respective condominium projects as respective instances of the location fixed effect variable;

retrieving an appraisal for a subject condominium property that identifies corresponding appraiser-identified comparables;

determining model-identified comparables corresponding to the subject condominium property using results of the hedonic regression;

evaluating at least one of the appraiser-identified comparables using a comparison to the model-identified comparables or the results of the hedonic regression;

displaying a map image corresponding to a geographical area;

displaying indicators on the map image indicative of the subject condominium property along with at least one of the appraiser-chosen comparables and the model-chosen comparables; and receiving a zooming input operation and updating the display of the map image with an adjustment of the indicators displayed on the map image as a result of the zooming input operation.

8. The computer readable medium of claim 7, wherein the operations further comprise:

prior to performing the hedonic regression, processing the property data to update membership of the subsets of properties in the respective condominium projects.

9. The computer readable medium of claim 8, wherein the operations further comprise:

applying an infilling process to include a given property as a member of a given condominium project, the infilling process examining a relationship between the given property and other properties already determined to be members of the given condominium project.

10. The computer readable medium of claim 8, wherein the operations further comprise:

determining standard names for the respective condominium projects and processing the property data to update records corresponding to the subsets of properties to include the standard names.

11. The computer readable medium of claim 7, wherein determining members of the respective condominium projects comprises:

determining a source of the property data corresponding to a given candidate condominium property; and identifying the given candidate condominium property as a condominium property at a high confidence factor where the source is determined to be a trusted source and the identification of the candidate condominium property as a condominium property by the source consistently occurs over a given period of time.

12. The computer readable medium of claim 7, wherein determining members of the respective condominium projects comprises:

identifying a root identifier that is determined to be common to a grouping of properties;

determining that the root identifier is associated with a given candidate condominium property that is otherwise determined to be a condominium property; and determining that other properties associated with the root identifier are condominium properties, based upon the determination that the given candidate condominium property is a condominium property.

* * * * *